Sept. 24, 1957   L. W. BUECHLER ET AL   2,807,776
MAGNETIC AMPLIFIER SYSTEM
Filed July 28, 1952

*INVENTORS*
LESTER W. BUECHLER
WILLIAM F. SCHMIDT, JR.
BY
*Clement J. Paynckas*
ATTORNEY

2,807,776

MAGNETIC AMPLIFIER SYSTEM

Lester W. Buechler, Kirkwood, and William F. Schmidt, Jr., St. Louis, Mo., assignors to Vickers Incorporated, Detroit, Mich., a corporation of Michigan Application July 28, 1952, Serial No. 301,412

10 Claims. (Cl. 323—89)

This invention relates to power transmission and more particularly to self-saturating reactor circuits.

The term "self-saturating" has an accepted meaning in the magnetic amplifier art and refers to a circuit in which the reactance or power winding of the reactor is traversed by intermittent unidirectional currents from the power supply, for example the type of circuit in which the reactor power winding is in series with a half wave rectifier which, discounting rectifier leakage, allows intermittent unidirectional currents to flow in the reactance winding only during half of each cycle of alternating potential applied to the circuit, thereby providing a certain amount of residual flux in the reactor core during the nonconducting half cycle or inactive period of the rectifier. The flux condition of the core, i. e., its permeability or degree of magnetic saturation, during the nonconducting half cycle of the rectifier, determines the firing angle of the reactor during the conducting half cycle of the rectifier, and the firing angle determines the output of the reactor.

Generally, the reactor in such circuits is provided with some means for applying control M. M. F.'s, for example a control winding traversed by the input signal or control current to generate M. M. F.'s either aiding or opposing the core flux during the nonconducting half cycle of the rectifier, i. e., in a saturating or desaturating direction, thereby increasing or decreasing the reactor output as desired. When pure direct current is used in the control winding, a particular reactor will have a certain output range for minimum to maximum output. However, it was found that when pulsed current, for example, pulsed direct current such as full or half wave rectified alternating current, is employed in such control windings, the output range of the reactor is narrowed as compared to the range attained with the same values of pure direct current. Such circuits are particularly sensitive to the phase and width of the control pulses, especially where the pulses are narrower than a half cycle of the power supply frequency. When pulsed control currents are employed in the control winding of a self-saturating reactor circuit, they cause a rapid rate of change of flux in the core thereby inducing undesirable currents and voltages in the power winding of the reactor during the nonconducting half cycle of the associated rectifier. Because of the high step-up ratio commonly employed between the turns of the control and power windings, these induced currents and voltages are relatively high and produce E. M. F.'s which cause conduction through a self-saturating rectifier producing M. M. F.'s in opposition to the control winding M. M. F.'s during the critical nonconducting half cycle. This condition is highly undesirable, especially when the reactor output is being driven downward. Under these conditions, cut-off or near cut-off of the reactor output cannot be realized.

In accordance with the present invention, the undesirable conditions encountered with the use of pulsed control current are substantially eliminated by providing a current path including a capacitor and inductively related to the reactor core, in which path currents induced by the control pulses circulate and produce M. M. F.'s which operate to reduce the rapid rate of change of the core flux due to pulsed control current, to broaden the base of control flux, and to aid in the control of the reactor especially when the reactor output is being driven downward. The net effect is to extend the range of the reactor output to or nearer to cut-off than is normally attainable with pulsed control current in addition to substantially desensitizing the reactor to the width and phase of the control pulses.

It is therefore an object of this invention to provide a new and useful self-saturating reactor circuit.

Another object of the invention is to improve the control of a self-saturating reactor circuit especially in driving the reactor output downward when pulsed control is employed.

A further object of the invention is to substantially eliminate the undesirable currents and voltages induced in the power winding of a saturable reactor in a self-saturating circuit by pulsed control M. M. F.'s.

Another object is to prevent undesirable current flow through the saturating rectifier during its nonconducting half cycle when pulsed control is employed in a self-saturating reactor.

Another object is to substantially desensitize a self-saturating reactor circuit to width and phase of control pulses.

Another object is to prevent the rapid rate of change of flux in the reactor core due to applied M. M. F. pulses.

Further objects and advantages of the present invention will be apparent from the following description, reference being had to the accompanying drawings wherein a preferred form of the present invention is clearly shown.

Figure 1:
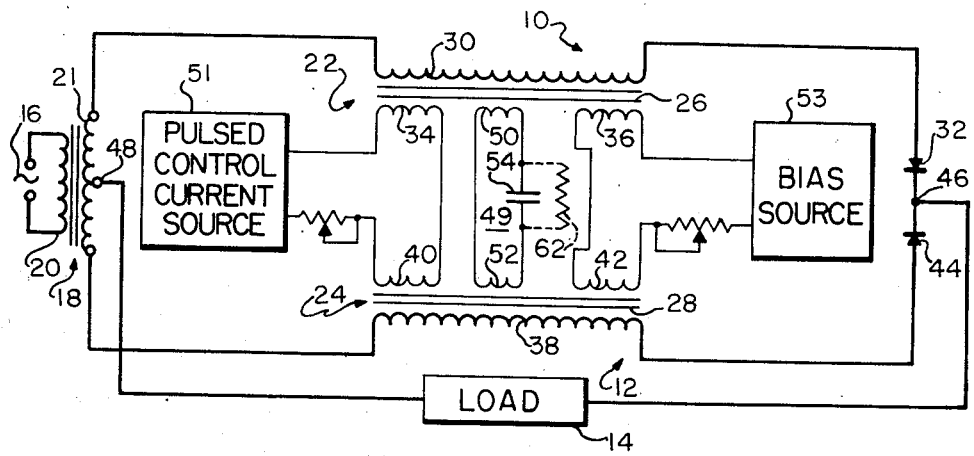
Figure 1 is a schematic diagram illustrating a preferred form of the invention.

In Figure 1, which illustrates a full-wave direct current output circuit, a pair of self-saturating reactor branches 10 and 12 are connected between a load 14 and an input supply circuit which receives supply current from a source of alternating current 16. The input supply circuit includes a transformer 18 with a primary 20 connected to the supply source 16, and a center tapped secondary 21 whose opposite ends are connected to the branches 10 and 14.

Each of the branches 10 and 14 includes the power winding of a reactor subjected to intermittent unidirectional currents by means of a rectifier connected in series with the winding. The reactors in branches 10 and 12 are indicated at 22 and 24, and are provided with saturable magnetic cores 26 and 28 respectively. A power winding 30 carried by the core 26 is connected in series with a rectifier 32. The core 26 also carries a control winding 34 and a bias winding 36. Likewise, the reactor 24 has a power winding 38, a control winding 40, and a bias winding 42, the power winding being connected in series with a rectifier 44. Both rectifiers are connected to a common terminal 46 which is one of the output terminals connected to the load 14, the other output terminal being the center tap 48 of the transformer secondary 21.

A suitable source 51 of pulsed control current is connected to the control coils 34 and 40, and the bias coils 36 and 42 receive bias current from a source 53. The control coils 34 and 40 are connected in series opposition with respect to fundamentals induced by the supply current. The bias coils 36 and 42 are likewise connected to cancel out induced fundamentals of the supply voltage.

The circuit thus far described is conventional and its operation is well known. During one half cycle of the applied supply voltage, for instance the half cycle during which rectifier 32 is nonconductive and rectifier 44 is conductive, current will flow from the lower end of the secondary 21, through the reactor power winding 38, and rectifier 44; thence through the load 14 to the center tap 48. On the opposite half cycle the rectifier 32 is conductive and current will flow from the branch 10 through the load 14 to the center tap 48. The current flow from either branch depends on the inductance of its reactor power winding which in turn is dependent upon the degree of magnetic saturation of its associated core. The degree of core magnetization during the nonconductive period of the associated rectifier controls the firing angle of the reactor involved. During this critical period the core saturation may be decreased or increased by adjusting the amplitude, or sense, or both, of the control current supplied to the control coils 34 and 40 from the source 42.

In the circuit thus far described, when the signal applied to the control windings 34 and 40 is pulsed, for example a full wave or half wave rectified alternating current, undesirable currents and voltages, which produce M. M. F.'s in opposition to the control M. M. F.'s such as to reduce the effectiveness of the control M. M. F.'s, are induced in the power windings 30 and 38 during their respective inoperative half cycles. To substantially eliminate these undesirable induced currents and voltages and to substantially desensitize the reactor to width and phase of control pulses in accordance with the present invention, there is provided a current path inductively related to the reactors and in which induced currents caused by the control pulses are allowed to flow, for example the current path indicated at 49. Included in the current path 49 are auxiliary windings 50 and 52 linking cores 22 and 24 respectively and connected in a series circuit including a capacitor 54, the windings 50 and 52 being connected in series opposition with respect to fundamental frequencies induced by the alternating current power supply. Thus the power supply fundamentals induced in the windings 50 and 52 cancel out and only harmonics of the supply, and currents induced by the control pulses, will flow in the path 49. The current path in accordance with the present invention is always arranged and related to the rest of the circuit in such manner that the connections to both sides of the capacitor have the same potentials with respect to fundamental frequencies derived from the supply voltage applied to the power windings.

The effect of the circulating currents induced in the current path 49 by the pulsed control current during the respective nonconducting periods of the rectifiers is to charge and discharge the condenser 54 during the respective nonconducting half cycles of each of the rectifiers 32 and 44, thereby setting up M. M. F.'s which combine algebraically with the control M. M. F.'s to produce a resultant flux with a broader base and a slower rate of change than the originally applied control M. M. F. pulses.

Although cores 26 and 28 are described as separate cores with separate control bias and auxiliary windings, it will be apparent to those skilled in the art that other core configurations and combinations may be used for example a single three-legged core may be employed to carry both power windings 30 and 38 in which case the circuit may be improved in accordance with the invention by arranging an auxiliary winding, connected in series with a capacitor, on the core in such manner that substantially no voltage of fundamental frequency of the power supply voltage is induced in the auxiliary winding.

Figure 2:
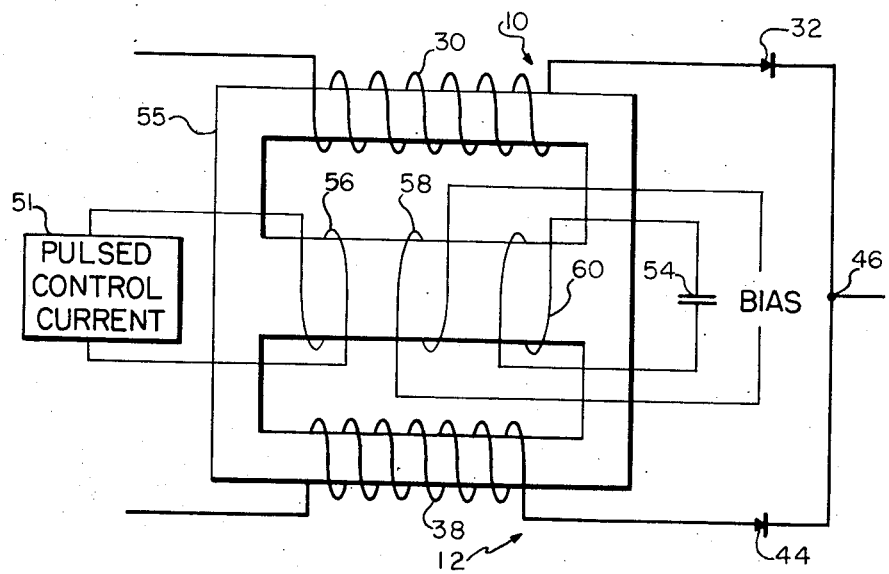
Figure 2 is a diagram showing a part of the circuit of Figure 1 with a different core arrangement embodying features of the invention.

Such an arrangement is illustrated in Figure 2 which shows the power windings 30 and 38 of Figure 1 mounted on a core 55 provided with a control winding 56, a bias winding 58 and an auxiliary winding 60 connected in series with the capacitor 54. The control winding 56 is connected to a source of pulsed control current 51. The windings 30 and 38 are so arranged that the fundamental fluxes generated in the core 55 by the supply current applied to the windings 30 and 38 cancel out in the middle leg of the core on which the auxiliary winding 60 is wound. Thus as in Figure 1, fundamental frequency voltages derived from the supply voltage are prevented from appearing across the condenser 54. In Figure 1 the fundamental frequency voltages derived from the supply are cancelled out in the electrical circuit of the current path of the invention, while in Figure 2 the fundamental frequency fluxes derived from the supply voltage are cancelled out in the magnetic circuit of the current path. Thus in both cases the circuit relations (magnetic and/or electrical) of the current path are such that substantially no fundamental frequency voltages derived from the supply voltage appear across capacitor 54. Put in other words, the potential on both sides of the capacitor is the same with respect to such fundamentals derived from the supply, i. e., either zero or the same finite value and sign. The single core arrangement shown in Figure 2 may be substituted for the core arrangement in the circuit of Figure 1.

Regardless of the particular arrangement of the cores and windings their relations should always be such that the series condenser in the current path provided in accordance with this invention be substantially free of fundamental frequencies derived from the power supply voltage.

The present invention is also effective in improving the output of a self-saturating reaction circuit employing alternating pulse control such as provided by alternating current pulses in which case the relation of the control windings 34 and 40 in Figure 1 is the reverse of that employed with direct current control currents.

Although the particular embodiment disclosed herein employs a control winding for receiving pulsed control signals, it will be appreciated that the present invention is equally applicable in any case where the reactor output is controlled by pulsed currents regardless of the particular winding in which the control pulses are injected since it is the control M. M. F. pulses generated by the pulsed control current which cause the undesirable effects in self-saturating reactor circuits.

A high resistance may be shunted across the condenser 54 to improve stability where the magnetic amplifier is unstable. Such a resistance is shown in a dotted line connection at 62 in Fig. 1. This resistor has the effect of eliminating undesirable oscillations which may occur in the circuit. Such a resistor is especially effective in eliminating undesirable oscillations when the present invention is applied to polyphase self-saturating reactor circuits. The resistor should not be of such a low value as to shunt out the charging and discharging of the condenser in its current path as hereinbefore described.

While the form of embodiment of the invention as herein disclosed constitutes a preferred form it is to be understood that other forms might be adopted, all coming with the scope of the claims which follow.

What is claimed is as follows:

1. A magnetic amplifier system comprising: a plurality of self-saturating reactor branches for controlling power supply to a load, each branch comprising saturable core means, a power winding inductively related to the core means, means inductively related to said core means for receiving control current, and a rectifier in series with said power winding to provide self-saturation in response to the application of a cyclic supply voltage to the branch, said rectifiers being sequentially periodically operable; an electromagnetic circuit including said core means and a current path, said path including in series a capacitor and auxiliary winding means inductively related to the core means and to said power windings; said power windings being disposed relative to said electromagnetic circuit so as to cancel out in said electromagnetic circuit inductive effects of fundamental frequency of said supply voltage; said path being conductively isolated thereby to carry only current induced therein.

2. A magnetic amplifier system comprising: a pair of self-saturating reactor branches coupled to a common conductor to control the passage of current through the conductor, each branch comprising saturable core means, a power winding inductively related to the core means, means inductively related to said core means for receiving control current, and a rectifier in series with said power winding to provide self-saturation in response to the application of a cyclic supply voltage to the branch, said rectifiers being alternately operable; an electromagnetic circuit including said core means and a current path, said path including in series a capacitor and auxiliary winding means inductively related to the core means and to said power windings; said power windings being disposed relative to said electromagnetic circuit so as to cancel out in said electromagnetic circuit inductive effects of fundamental frequency of said supply voltage; said path being conductively isolated thereby to carry only current induced therein.

3. A magnetic amplifier system comprising: a plurality of self-saturating reactor branches, each branch comprising saturable core means, a power winding inductively related to the core means, means inductively related to said core means for receiving control current and a rectifier in series with said power winding to provide self-saturation in response to the application of a cyclic supply voltage to the branch; and an electromagnetic circuit including said core means and a current path including in series a capacitor and auxiliary winding means inductively related to the core means and to said power windings; said power windings being so disposed relative to said circuit as to have on said electromagnetic circuit oppositely related inductive effects of fundamental frequency of said applied supply voltage; said path being conductively isolated thereby being able to carry only current induced therein.

4. A magnetic amplifier system comprising: a plurality of self-saturating reactor branches for controlling the power supplied to a load from a power supply source, each branch comprising saturable core means, a power winding inductively related to the core means, means inductively related to said core means for receiving control current, and a rectifier in series with said power winding to provide self-saturation in response to the application of a cyclic supply voltage to the branch, said rectifiers being sequentially periodically operable; electromagnetic means including said core means and an auxiliary winding inductively related to the core means and to said power windings; and a current path including in series said auxiliary winding and a capacitor; said power windings being disposed relative to said electromagnetic means so as to cancel out fluxes of fundamental frequency of said applied supply voltage; said path being conductively isolated thereby being able to carry only current induced therein.

5. A magnetic amplifier system comprising: a saturable core; a pair of self-saturating reactor branches coupled to a common conductor to control the passage of current through the conductor, each branch comprising a power winding inductively related to said core, means inductively related to said core for receiving control current, and a rectifier in series with said power winding to provide self-saturation in response to the application of a cyclic supply voltage to the branch, said rectifiers being alternately operable; electromagnetic means including said core and an auxiliary winding inductively related to the core and to said power windings; and a current path including in series said auxiliary winding and a capacitor; said power windings being disposed relative to said electromagnetic means so as to cancel out fluxes of fundamental frequency of said applied supply voltage; said path being conductively isolated thereby being able to carry only current induced therein.

6. A magnetic amplifier system comprising: a plurality of self-saturating reactor branches for controlling power supply to a load, each branch comprising a saturable core, a power winding inductively related to the core, an auxiliary winding inductively related to the core, means inductively related to said core for receiving control current, and a rectifier in series with said power winding to provide self-saturation in response to the application of a cyclic supply voltage to the branch, said rectifiers being sequentially periodically operable; and a current path including in series said auxiliary windings and a capacitor; said power windings being disposed relative to said auxiliary windings so as to cancel out in said path induced voltages of fundamental frequency of said applied supply voltage; said path being conductively isolated thereby to carry only current induced therein.

7. A magnetic amplifier system comprising: a pair of self-saturating reactor branches coupled to a common conductor to control the passage of current through the conductor, each branch comprising a saturable core, a power winding inductively related to the core, an auxiliary winding inductively related to the core, means inductively related to said core for receiving control current, and a rectifier in series with said power winding to provide self-saturation in response to the application of a cyclic supply voltage to the branch, said rectifiers being alternately operable; and a current path including in series said auxiliary windings and a capacitor; said auxiliary windings being connected in series opposition with respect to fundamental frequencies derived from said applied supply voltage; said path being conductively isolated thereby being able to carry only current induced therein.

8. A magnetic amplifier system comprising: a source of pulsed control current; a plurality of self-saturating reactor branches for controlling power supply to a load, each branch comprising saturable core means, a power winding inductively related to the core means, means inductively related to said core means for receiving said pulsed control current, and a rectifier in series with said power winding to provide self-saturation in response to the application of a cyclic supply voltage to the branch, said rectifiers being sequentially periodically operable; an electromagnetic circuit including said core means and a current path, said path including in series a capacitor and auxiliary winding means inductively related to the core means and to said power windings; said power windings being disposed relative to said electromagnetic circuit so as to cancel out in said electromagnetic circuit inductive effects of fundamental frequency of said supply voltage; said path being conductively isolated thereby to carry only current induced therein.

9. A magnetic amplifier system comprising: a source of pulsed control current; a plurality of self-saturating reactor branches for controlling the power supplied to a load from a power supply source, each branch comprising saturable core means, a power winding inductively related to the core means, means inductively related to said core means for receiving said pulsed control current, and a rectifier in series with said power winding to provide self-saturation in response to the application of a cyclic supply voltage to the branch, said rectifiers being sequentially periodically operable; electromagnetic means including said core means and an auxiliary winding inductively related to the core means and to said power windings; and a current path including in series said auxiliary winding and a capacitor; said power windings being disposed relative to said electromagnetic means so as to cancel out fluxes of fundamental frequency of said applied supply voltage; said path being conductively isolated thereby being able to carry only current induced therein.

10. A magnetic amplifier system comprising: a source of pulsed control current; a plurality of self-saturating reactor branches for controlling power supply to a load, each branch comprising a saturable core, a power winding inductively related to the core, an auxiliary winding inductively related to the core, means inductively related to said core for receiving said pulsed control current, and a rectifier in series with said power winding to provide self-saturation in response to the application of a cyclic supply voltage to the branch, said rectifiers being sequentially periodically operable; and a current path including in series said auxiliary windings and a capacitor; said power windings being disposed relative to said auxiliary windings so as to cancel out in said path induced voltages of fundamental frequency of said applied supply voltage; said path being conductively isolated thereby to carry only current induced therein.

References Cited in the file of this patent

UNITED STATES PATENTS

| | | |
|---|---|---|
| 1,921,787 | Suits | Aug. 8, 1933 |
| 2,468,878 | Huge | May 3, 1949 |
| 2,594,022 | Horton | Apr. 22, 1952 |
| 2,680,831 | Belamin | June 8, 1954 |